United States Patent
Watanabe et al.

(10) Patent No.: US 12,509,137 B2
(45) Date of Patent: Dec. 30, 2025

(54) STEER-BY-WIRE STEERING SYSTEM WITH ACCELERATION DEPENDENT STEERING TORQUE FEEDBACK

(71) Applicants: thyssenkrupp Presta AG, Eschen (LI); Honda Motor Co., Ltd., Tokyo (JP)

(72) Inventors: Yoshinobu Watanabe, Wako (JP); Munetsugu Hanji, Wako (JP); Péter Kakas, Budapest (HU); Krisztián Dömötör, Zalaegerszeg (HU); Zoltán Szander, Tárnok (HU); Adam Szabo, Budapest (HU)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 599 days.

(21) Appl. No.: 17/969,019

(22) Filed: Oct. 19, 2022

(65) Prior Publication Data
US 2023/0038390 A1    Feb. 9, 2023

Related U.S. Application Data
(63) Continuation of application No. PCT/EP2020/061024, filed on Apr. 20, 2020.

(51) Int. Cl.
B62D 5/00    (2006.01)
(52) U.S. Cl.
CPC ................... B62D 5/006 (2013.01)

(58) Field of Classification Search
CPC ................... B62D 5/005; B62D 5/006
See application file for complete search history.

(56) References Cited

U.S. PATENT DOCUMENTS
10,518,775 B1 *  12/2019  Velazquez Alcantar ............... B60L 15/2045

FOREIGN PATENT DOCUMENTS
| | | |
|---|---|---|
| EP | 2 772 410 A1 | 9/2014 |
| EP | 2944545 A1 * | 11/2015 ........... B62D 5/0463 |
| WO | WO-2019185305 A1 * | 10/2019 |

OTHER PUBLICATIONS
Official Communication issued in International Patent Application No. PCT/EP2020/061024, mailed on Jan. 14, 2021.
Official Communication issued in International Patent Application No. PCT/EP2020/061024, issued on Oct. 25, 2022.

* cited by examiner

*Primary Examiner* — Jacob D Knutson
(74) *Attorney, Agent, or Firm* — Keating & Bennett, LLP

(57) ABSTRACT

A method to control a steer-by-wire steering system of a road vehicle including a road wheel actuator to turn steerable road wheels and a steering wheel actuator to apply a feedback torque to a steering wheel, includes calculating the feedback torque by modifying a base steering torque as a function of a longitudinal and/or lateral acceleration measured by sensors of the vehicle, and sending the calculated feedback torque to the steering wheel actuator to provide feedback to the driver at the steering wheel.

12 Claims, 2 Drawing Sheets

STEER-BY-WIRE STEERING SYSTEM WITH ACCELERATION DEPENDENT STEERING TORQUE FEEDBACK

CROSS REFERENCE TO RELATED APPLICATIONS

This application claims the benefit of priority to PCT Application No. PCT/EP2020/061024 filed on Apr. 20, 2020. The entire contents of each application are hereby incorporated herein by reference.

BACKGROUND OF THE INVENTION

1. Field of the Invention

The present invention relates to a method to control a steer-by-wire steering system of a road vehicle and to a steer-by-wire steering system for a road vehicle.

2. Description of the Related Art

Steer-by-wire steering systems are the successors of conventional automotive electrically powered steering systems. In steer-by-wire steering systems, there is no mechanical connection between the steering wheel and the steering rack and the steerable wheels. Such systems consist mainly of two elements: a road wheel actuator for setting the road wheel angle and a steering wheel actuator, also called feedback actuator, for steering effort provision.

During vehicle acceleration, a weight transfer toward the rear wheels occurs. Conversely, under braking, weight transfer toward the front of the car occurs.

In conventional electromechanical steering systems, the weight transfer results in a change of load on the rack and pinion steering gear. The weight transfer thus influences the steering feel and can be felt by the driver.

The lack of the steering column and the indirect feedback torque on the steering wheel provided by the steering wheel actuator leads to missing additional feedback torque of the vehicle's weight transfer during longitudinal acceleration and deceleration and partially during lateral acceleration, because these movements only affect the road wheel actuator. The driver experiences a notable and undesired difference in driving feel compared to electric power steering systems.

SUMMARY OF THE INVENTION

Preferred embodiments of the present invention provide methods to control steer-by-wire steering systems of road vehicles and steer-by-wire steering systems, each of which creates a steering feel like electric assisted power steering systems.

A method to control a steer-by-wire steering system of a road vehicle is provided, wherein the steer-by-wire steering system includes a road wheel actuator to turn steerable road wheels, and a steering wheel actuator to apply a feedback torque to a steering wheel, the method including calculating the feedback torque by modifying a base steering torque as a function of a longitudinal and/or lateral acceleration measured by sensors of the vehicle, and sending the calculated feedback torque to the steering wheel actuator to provide feedback to a driver at the steering wheel.

As a result, a weight transfer of the vehicle and a change in load on the road wheel actuator is reproduced in the feedback torque. This improves the imitation of a feeling provided by electric assisted power steering systems.

Preferably, the modification includes a lateral weight transfer torque, which is a factor, dependent on the absolute lateral acceleration. This factor is multiplied by the base steering torque to account for lateral weight transfer.

It is advantageous if the lateral weight transfer factor is vehicle speed dependent.

The modification can also include a longitudinal weight transfer torque, which is a factor dependent on the longitudinal acceleration. This factor is multiplied by the base steering torque to account for longitudinal weight transfer.

It is advantageous if the longitudinal weight transfer factor is vehicle speed dependent.

In a preferred embodiment, the base steering torque is calculated with a basic feedback function, wherein the basic feedback function has multiple inputs and dependencies.

Instead of the factor-based modification method, one of the inputs can represent the load on the front wheel axle which can be a calculated value or a measured value based on vehicle states and/or feedback actuator states. Preferably, this representation of the load input is offset by a longitudinal acceleration dependent value, resulting in a modified base steering torque which includes the effect of the longitudinal load transfer.

If the factor-based modification method is not used for lateral acceleration, the representation of the load input can be offset by an absolute lateral acceleration dependent value, resulting in a lateral weight transfer torque.

Preferably, the offset values are vehicle speed dependent.

Further, a steer-by-wire steering system for a road vehicle designed to carry out the above-mentioned method is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
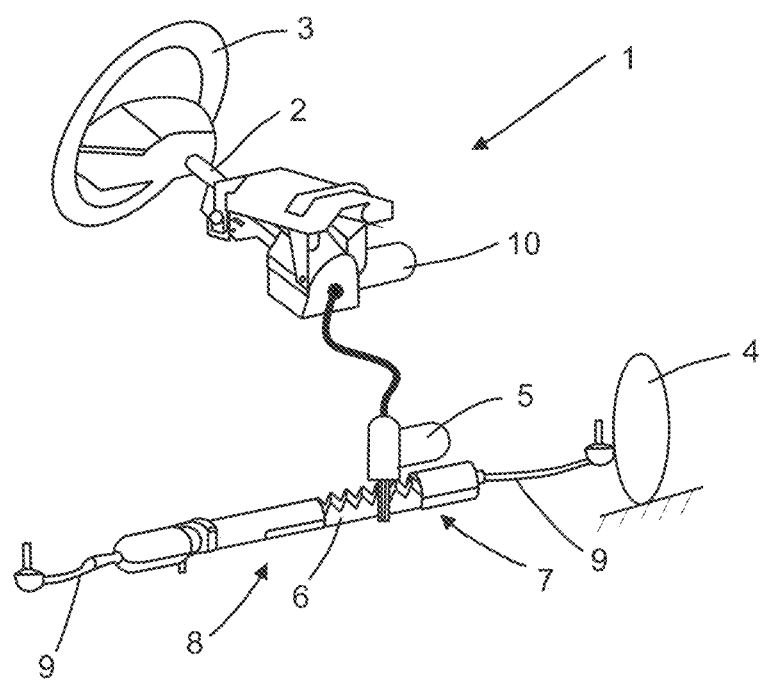
FIG. 1 is a schematic illustration of a steer-by-wire steering system of a motor vehicle.

FIG. 1 is a schematic drawing of a steer-by-wire system 1 with a steering shaft 2 connected to a steering wheel 3. There is no mechanical connection between the steering wheel 3 and the road wheels 4. A road wheel actuator 5 operates a gear rack 6 via a rack-and-pinion gear 7, which is part of a front wheel axle 8. The front wheel axle 8 includes two tie rods 9 for road wheels 4, of which only one road wheel 4 is shown.

When a driver operates the steering wheel 3, steering shaft 2 is rotated, which is detected by a shaft sensor, which is not shown in the drawings. A controller generates an operation signal for the road wheel actuator 5 from the signal detected by the shaft sensor. By operating gear rack 6 with the operation signal, the front wheel axle 8 is moved sideways and the road wheels 4 are turned. At the same time, forces introduced in the wheel axle 8 from the road wheels 4 are recognized by another sensor not shown in the drawings, and a feedback signal is generated, which is applied to the steering shaft 2 by a steering wheel actuator 10, also called feedback actuator, so that the operator can recognize the feedback in the steering wheel 3.

The feedback torque of the steering wheel actuator 10 is modified to mimic a driving feel of electric power steering systems. The modification is dependent on the vehicle's longitudinal acceleration and/or the lateral acceleration measured by the vehicle's sensors.

In case the road wheel actuator 5 is situated at the front axle 8, the load on the road wheel actuator 5 will be reduced during longitudinal acceleration compared to constant speed, because of weight transfer. Conversely, during longitudinal deceleration, the load on the road wheel actuator 5 will be higher compared to the load at constant speed. To account for weight transfer, the modification will decrease feedback torque compared to zero longitudinal deceleration/acceleration (constant longitudinal speed) in case of acceleration and increase feedback torque in case of deceleration.

In case of lateral acceleration of the vehicle, the feedback torque will be direction independently higher compared to zero absolute lateral acceleration.

The increment or decrement rate of the feedback torque modification is preferably adjustable for different situations.

In order to achieve the modification, a base steering torque is modified as a function of a longitudinal and/or lateral acceleration measured by the vehicle's sensors. The resulting feedback torque is sent to the steering wheel actuator to provide feedback to the driver.

The base steering torque is determined based on multiple input signals of the vehicle states and/or feedback actuator states. The function is called a basic feedback function. The base steering torque thus generates a base steering feel.

In a first preferred embodiment, a longitudinal weight transfer factor depends on the longitudinal acceleration signal value. The longitudinal weight transfer factor is multiplied with the base steering torque to account for weight transfer. The longitudinal weight transfer factor is further dependent on vehicle speed.

Figure 2:
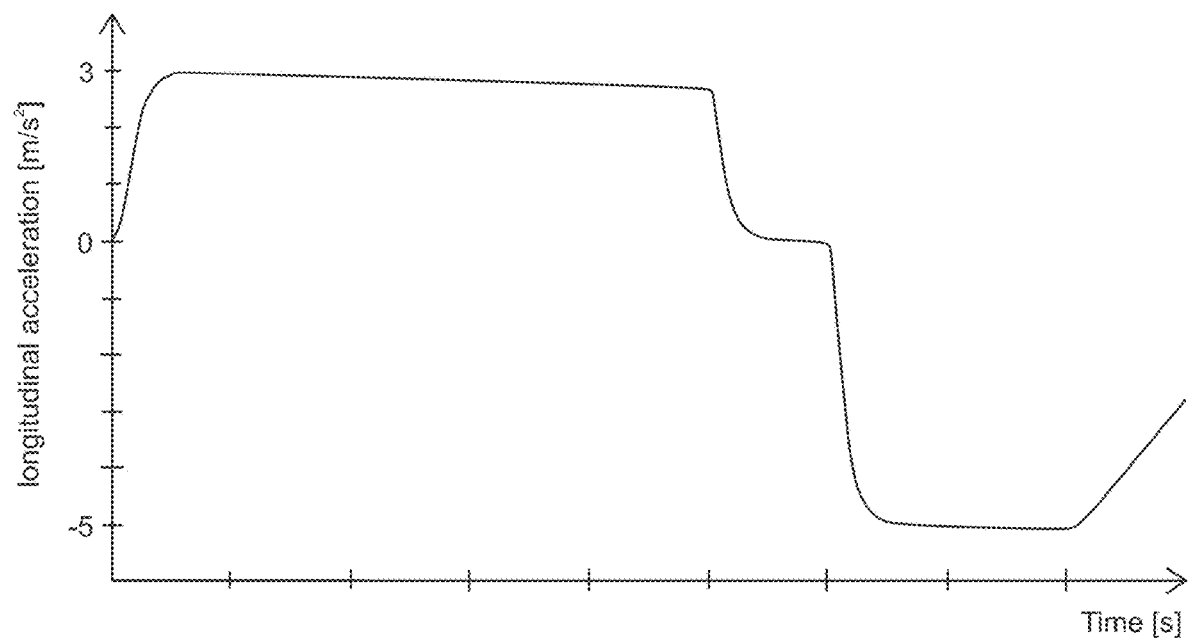
FIG. 2 shows a diagram of the longitudinal vehicle acceleration plotted against time.
Figure 3:
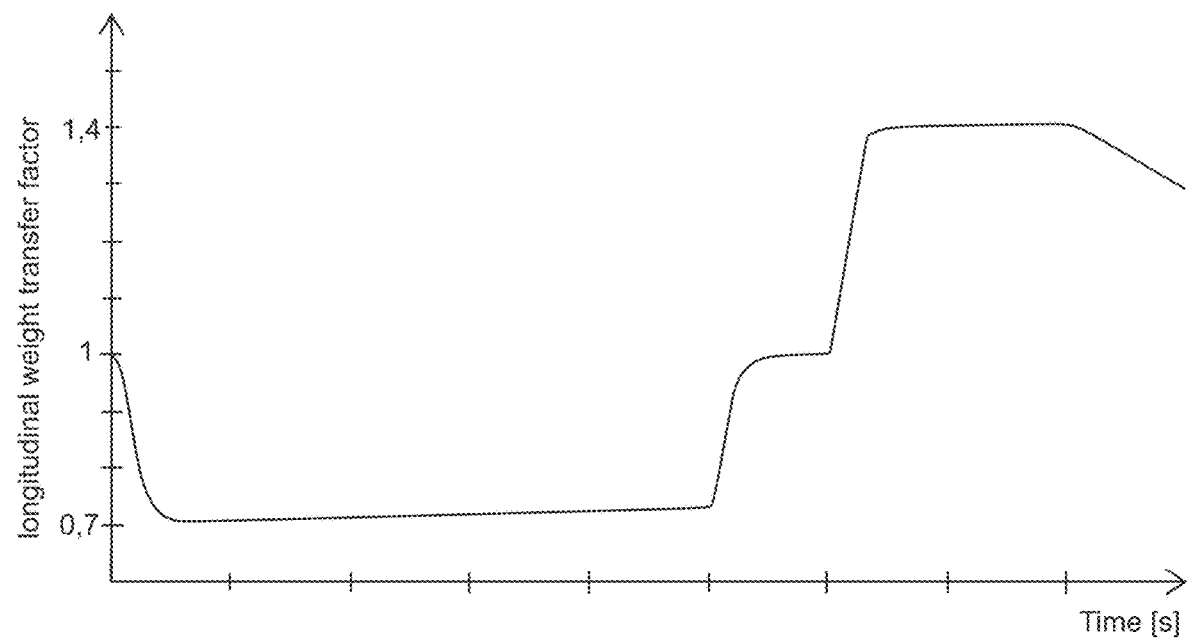
FIG. 3 shows a diagram of a longitudinal weight transfer factor plotted against time.

FIGS. 2 and 3 show an example of the longitudinal weight transfer factor modification. In FIG. 2, the longitudinal acceleration is plotted against time. At first the longitudinal acceleration rises up to about 3 m/s$^2$, remains steady for a while and then decreases to zero, for example. After that the vehicle decelerates with up to about 5 m/s$^2$, for example. Accordingly, the longitudinal weight transfer factor shown in FIG. 3 changes with time. At first the longitudinal weight transfer factor decreases from about 1 to about 0.7, for example. In the shown example, a longitudinal weight transfer factor of about 0.7 accounts for an acceleration of about 3 m/s$^2$. The longitudinal weight transfer factor then increases to about 1 and further, with deceleration of the vehicle, to about 1.4, for example.

A lateral weight transfer factor depends on the lateral acceleration signal value. The lateral weight transfer factor is multiplied with the base steering torque to account for weight transfer. The lateral weight transfer factor is dependent on vehicle speed. The lateral acceleration signal value represents the absolute value of the vehicle's lateral acceleration sensor. In other words, the lateral weight transfer factor is independent of the direction of the lateral acceleration/deacceleration.

The resulting feedback torque is sent to the steering wheel actuator.

In a second preferred embodiment, the modification is an offset.

One of the inputs of the basic feedback function can represent the load on the front wheel axle which can be a calculated or measured value based on vehicle states and/or feedback actuator states. The input is the so-called representation of the load input. It is offset by a longitudinal acceleration dependent value, modifying the resulting feedback torque. The longitudinal acceleration dependent value has vehicle speed dependency.

The representation of the load input of the basic feedback function can be further offset by an (absolute) lateral acceleration dependent value. The lateral acceleration dependent value has vehicle speed dependency.

The increment and decrement rate of the longitudinal weight transfer factor and the longitudinal acceleration dependent offset value is adjustable and dependent on the lateral acceleration to avoid unpleasant sudden change of the feedback torque in case of, e.g., hard braking and cornering situation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to control a steer-by-wire steering system of a road vehicle including a road wheel actuator to turn steerable road wheels and a steering wheel actuator to apply a feedback torque to a steering wheel, the method comprising:

calculating the feedback torque by modifying a base steering torque as a function of a longitudinal and lateral acceleration measured by sensors of the vehicle to account for a weight transfer of the vehicle such that, when the vehicle experiences lateral acceleration, the feedback torque will be higher, direction independent, than the feedback torque would be when there is zero absolute lateral acceleration; and sending the calculated feedback torque to the steering wheel actuator to provide feedback to the driver at the steering wheel.

2. The method according to claim 1, wherein the modifying includes multiplying the base steering torque by a lateral weight transfer torque factor, which is dependent on an absolute lateral acceleration.

3. The method according to claim 2, wherein an increment rate or a decrement rate of longitudinal and/or lateral weight transfer torque factors used in modifying the base steering torque is adjustable and dependent on the lateral acceleration.

4. The method according to claim 1, wherein the modifying includes multiplying the base steering torque by a longitudinal weight transfer torque factor, which is dependent on the longitudinal acceleration.

5. The method according to claim 1, wherein a longitudinal and/or lateral weight transfer torque factor used in modifying the base steering torque is vehicle speed dependent.

6. The method according to claim 1, wherein the base steering torque is calculated with a basic feedback function including multiple inputs and dependencies.

7. The method according to claim 6, wherein one of the inputs includes a representation of a load input.

8. The method according to claim 7, wherein the representation of the load input is offset by a longitudinal acceleration dependent value, resulting in a modified base steering torque which includes an effect of a longitudinal load transfer.

9. The method according to claim 8, wherein offset values are vehicle speed dependent.

10. The method according to claim 8, wherein an increment rate or a decrement rate of offset values is adjustable and dependent on the lateral acceleration.

11. The method according to claim 7, wherein the representation of the load input is offset by an absolute lateral acceleration dependent value, resulting in a modified base steering torque which includes an effect of a lateral load transfer.

12. A steer-by-wire steering system for a road vehicle configured to carry out the method according to claim 1.

* * * * *